United States Patent
Yu et al.

(10) Patent No.: US 10,164,711 B2
(45) Date of Patent: Dec. 25, 2018

(54) OPTICAL MM-WAVE SIGNAL GENERATION USING A SINGLE IQ MODULATOR

(71) Applicant: ZTE Corporation, Shenzhen (CN)

(72) Inventors: Jianjun Yu, Basking Ridge, NJ (US); Xinying Li, Morristown, NJ (US); Hung-Chang Chien, Bridgewater, NJ (US)

(73) Assignee: ZTE Corporation, Shenzhen (CN)

( * ) Notice: Subject to any disclaimer, the term of this patent is extended or adjusted under 35 U.S.C. 154(b) by 49 days.

(21) Appl. No.: 15/499,799

(22) Filed: Apr. 27, 2017

(65) Prior Publication Data

US 2017/0317760 A1 Nov. 2, 2017

Related U.S. Application Data

(60) Provisional application No. 62/329,911, filed on Apr. 29, 2016.

(51) Int. Cl.
*H04B 10/516* (2013.01)
*H04L 27/36* (2006.01)

(52) U.S. Cl.
CPC ..... *H04B 10/5161* (2013.01); *H04B 10/5165* (2013.01); *H04L 27/364* (2013.01)

(58) Field of Classification Search
CPC .............. H04B 10/516; H04B 10/5161; H04B 10/5165
See application file for complete search history.

(56) References Cited

U.S. PATENT DOCUMENTS

| | | | | |
|---|---|---|---|---|
| 2014/0363159 A1* | 12/2014 | Chien | ................... | H04B 10/506 398/43 |
| 2015/0071641 A1* | 3/2015 | Wen | ................... | H04B 10/5165 398/98 |
| 2017/0214485 A1* | 7/2017 | Yu | ....................... | H04L 27/2601 |

OTHER PUBLICATIONS

Chien, H.-C., et al., "Optical independent-sideband modulation for bandwidth-economic coherent transmission," Optics Express, 22(8): 9465-9470, Apr. 2014.

(Continued)

*Primary Examiner* — Nathan M Cors
(74) *Attorney, Agent, or Firm* — Perkins Coie LLP

(57) ABSTRACT

A scheme for generating asymmetric single sideband photonic vector signal at millimeter wave spectral region is described. At a transmitter, information bits to be transmitted are modulated using a vector modulation technique to generate a baseband signal. The baseband signal is converted into its single sideband (SSB) version using a complex frequency source having a first frequency. The real part of the upconverted signal is added to the real part of a second frequency source and is input as I component to an I/Q modulator. The imaginary part of the upconverted signal is added to the imaginary part of the second frequency source and is used as the Q component. The I/Q modulator is driven by a laser source at frequency fc. The resulting signal is transmitter over an optical transmission medium and upconverted by a single-ended photodiode to a desired radio-frequency (RF) carrier frequency.

19 Claims, 9 Drawing Sheets

(56) References Cited

OTHER PUBLICATIONS

Kanno, A., et al., "40 Gb/s W-band (75-110 GHz) 16-QAM radio-over-fiber signal generation and its wireless transmission," 37th European Conference and Exposition on Optical Communications, OSA Technical Digest (CD) (Optical Society of America, 2011), Geneva, Switzerland, Paper We.10.P1.112, 3 pages, Sep. 2011.

Kitayama, K., et al., "Digital Coherent Technology for Optical Fiber and Radio-Over-fiber Transmission Systems," Journal of Lightwave Technology, 32(20):3411-3420, Oct. 2014.

Li, X., et al., "Field Trial of 80-Gb/s PDM-QPSK Signal Delivery over 300-m Wireless Distance with MIMO and Antenna Polarization Multiplexing at W-band," Optical Fiber Communication Conference Post Deadline Papers, OSA Technical Digest (online) (Optical Society of America, 2015), Los Angeles, California, United States of America, Paper Th5A.5, 3 pages, Mar. 2015.

Li, X., et al., "QAM Vector Signal Generation by Optical Carrier Suppression and Precoding Techniques," IEEE Photonics Technology Letters, 27(18):1977-1980, Sep. 2015.

Li, X., et al., "W-Band 8QAM Vector Signal Generation by MZM-Based Photonic Frequency Octupling," IEEE Photonics Technology Letters, 27(12):1257-1260, Jun. 2015.

Ma, J., et al., "Fiber Dispersion Influence on Transmission of the Optical Millimeter-Waves Generated Using LN-MZM Intensity Modulation," Journal of Lightwave Technology, 25(11):3244-3256, Nov. 2007.

Xiao, J., et al., "High-Frequency Photonic Vector Signal Generation Employing a Single Phase Modulator," IEEE Photonics Journal, 7(2):7101206(1-7), Apr. 2015.

Yu, J., et al., "432-Gb/s PDM-16QAM Signal Wireless Delivery at W-band Using Optical and Antenna Polarization Multiplexing," European Conference on Optical Communication (ECOC), Cannes, France, Paper We.3.6.6, 3 pages, Sep. 2014.

Zhang, L., et al., "Transmission of 112-Gb/s+ DMT over 80-km SMF Enabled by Twin-SSB Technique at 1550nm," 2015 European Conference on Optical Communication (ECOC), Paper We4.6.4, 3 pages, Sep. 2015.

\* cited by examiner

OPTICAL MM-WAVE SIGNAL GENERATION USING A SINGLE IQ MODULATOR

CROSS REFERENCE TO RELATED APPLICATIONS

This patent application claims the benefit of U.S. Provisional Patent Application No. 62/329,911, filed on Apr. 29, 2016. The entire content of the before-mentioned patent application is incorporated by reference as part of the disclosure of this application.

BACKGROUND

The wide-spread adoption of multimedia services, broadband internet, and cloud services, among others, has driven the demand of high transmission capacity of optical systems such as short-reach links, access, and metro networks. Typically, it requires optical transmission systems with high data rates (e.g., up to 1 Tb/s and beyond). One such solution includes the use of radio-over-fiber (RoF) architecture in which a fiber optic network is used to carry wireless signals to long distances, by directly sending the wireless signals through fiber via electro-optical conversion.

SUMMARY

The present document discloses a simplified transmission technique in which a single I/Q modulator is used to generate an asymmetric, single sideband photonic mm-wave signal. In addition to simplifying the transmitter structure, the transmission scheme overcomes non-linear distortions such as walk-off effect while propagating over fiber transmission medium, thereby simplifying receiver implementations by eliminating the need to have optical dispersion compensation. One prototype built by the inventors achieved transmission and reception of 4-Gbaud 80-GHz QPSK modulated single-sideband vector mm-wave signal over an 80 km SMF-28 optical transmission medium without requiring optical dispersion compensation.

In one example aspect, a method for optical communication is disclosed. The method includes receiving information bits, modulating the information bits to generate a complex vector signal at baseband, mixing the complex baseband signal with a complex sinusoidal signal at a negative first frequency to produce a lower sideband (LSB) vector signal at the negative first frequency, generating an I-component by adding a real part of the LSB vector signal with a real part of the complex sinusoidal signal at a positive second frequency, generating a Q-component by adding an imaginary part of the LSB vector signal with an imaginary part of the complex sinusoidal signal at the positive second frequency, producing, using an I/Q modulator, from the I-component, the Q-component and an optical source at a carrier frequency, an optical SSB signal, upcoverting the optical SSB signal to a desired radio-frequency (RF) carrier frequency, and transmitting the signal at the desired RF carrier frequency over a transmission medium.

In yet another aspect, an optical transmission apparatus is disclosed. The apparatus includes a data interface, a digital signal processor with memory, an IQ modulator, a photodiode and an optical signal transmitter. The data interface that receives information bits. The digital signal processor to read instructions stored on a memory to implement a method, the instructions comprises, code for modulating the information bits to generate a complex vector signal at baseband, code for mixing the complex baseband signal with a complex sinusoidal source at a negative first frequency to produce a lower sideband (LSB) vector signal at the negative first frequency, code for generating an I-component by adding a real part of the LSB vector signal with a real part of a complex sinusoidal signal at a positive second frequency, and code for generating a Q-component by adding an imaginary part of the LSB vector signal with an imaginary part of the complex sinusoidal signal at the positive second frequency. The I/Q modulator configured to obtain an optical SSB signal from the I-component, the Q-component and an optical source at a carrier frequency. The photodiode is configured to upcovert the optical SSB signal to a desired radio-frequency (RF) carrier frequency. The signal transmission stage transmits the signal at the desired RF carrier frequency over a transmission medium.

These and other aspects, and example implementations and variations are set forth in the drawings, the description and the claims.

DETAILED DESCRIPTION

To meet the increasing demand on high data communication bandwidth, developers are continuously looking for new ways by which to carry a greater number of data bits over existing communication infrastructure. In optical communication, data is transmitted over optical carriers, e.g., glass or plastic optical fibers by modulating using a variety of different techniques. Some techniques implement data modulation in the electrical domain, e.g., by processing electronic signals. Alternatively, or in addition, data modulation can also be achieved in the optical domain.

As mentioned, there has been an ever increasing research interest in applying W-band mm-wave (75 GHz-110 GHz) with large available bandwidth and spectral-efficient vector signal modulation into RoF systems in order to meet the large-capacity demands of emerging mobile data communication. Many experimental demonstrations on W-band photonic vector mm-wave signal generation have been reported employing precoding-assisted photonic frequency multiplication schemes based on a single electro-optic intensity modulator or phase modulator. These schemes provide high-stability high-purity vector mm-wave signal generation, and also could significantly reduce the requirement of transmitter component bandwidth. In these schemes, however, the adoption of precoding significantly reduces the Euclidean distance of transmitter constellation and thus restricts the system performance, particularly for those systems with larger frequency multiplication factors and/or higher-level modulation formats. Moreover, reachable fiber transmission distance is relatively short since the two sidebands used for heterodyne beating both carry signal and are thus sensitive to fiber dispersion due to walk-off effect.

The techniques described in this document overcome these operational limitations, and others. A photonic vector mm-wave signal generation scheme adopting asymmetrical single-sideband modulation (SSBM) through the use of an I/Q modulator is disclosed. The I/Q modulator output has one vector-modulated USB (LSB) and one un-modulated LSB (USB) at different sideband frequencies with respect to the significantly suppressed central optical carrier. Our proposed scheme avoids transmitter-based precoding, and can realize relatively long-haul fiber transmission because of the employment of SSBM to overcome walk-off effect in fiber. Adopting our proposed scheme, we experimentally demonstrate photonic generation of 4-Gbaud 80-GHz QPSK-modulated SSB vector mm-wave signal based on the combination of 38-GHz LSB signal and 42-GHz USB carrier, which can be delivered over 80-km SMF-28 without optical dispersion compensation and 20-cm wireless distance with a BER less than the HD-FEC threshold of $3.8 \times 10^{-3}$.

Figure 1:
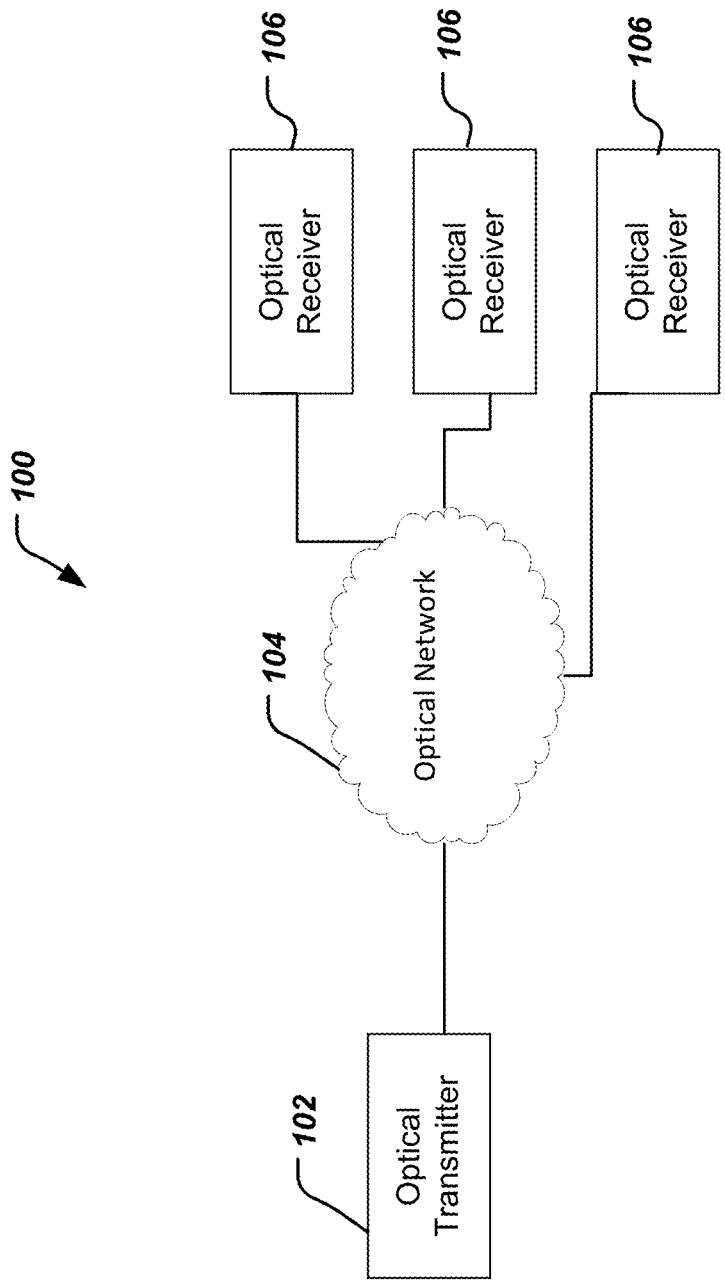
FIG. 1 shows an example block diagram of a system to transmit and receive signals.

FIG. 1 shows an example block diagram of an Optical Communication System 100 used to generate and receive optical signals. FIG. 1 depicts an optical communication system 100 in which the presently disclosed technology can be embodied. One or more optical transmitters 102 are communicatively coupled via an optical network 104 with one or more optical receivers 106. The optical network 104 may comprise optical fibers that extend in length from several hundred feet (e.g., last mile drop) to several thousands of kilometers (long haul networks). The transmitted optical signals may go through intermediate optical equipment such as amplifiers, repeaters, switch, etc., which are not shown in FIG. 1 for clarity.

Figure 2:
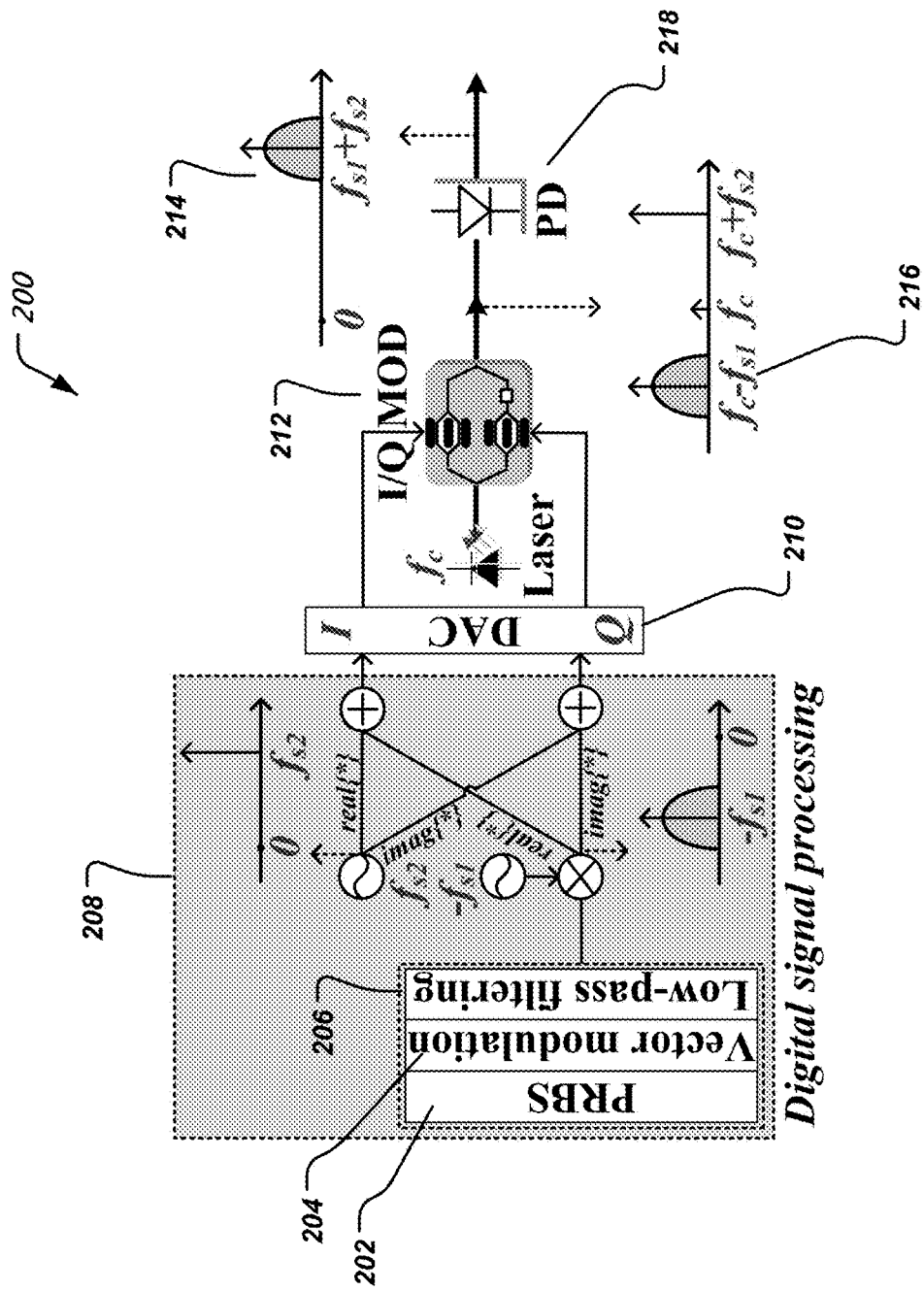
FIG. 2 shows an example diagram of optical sources for a laser section.

FIG. 2 shows the principle of a photonic vector mm-wave signal generation scheme 200 adopting asymmetrical SSBM enabled by an I/Q modulator 212. At the transmitter side, a PRBS, for testing, or information bits in general (202), with a certain length is vector modulated (204) and optionally low-pass filtered (206) to generate a baseband vector signal, which can adopt various kinds of vector modulation formats, including QPSK, 8QAM, 16QAM, and 64QAM and so on. When the positive or negative spectrum of a real sinusoidal RF source is removed or filtered by Hilbert-transform phasing method, a complex sinusoidal RF source with one-sided spectrum can be attained and it is typically used for SSB modulation. Thus, after mixing with a complex sinusoidal RF source at negative frequency $-f_{s1}$, the baseband vector signal is linearly up-converted to a LSB vector signal located at carrier frequency $-f_{s1}$. Next, the real and imaginary parts of the LSB vector signal are added with the real and imaginary parts of a complex sinusoidal RF source at positive frequency $f_{s2}$, respectively. Then, the real and imaginary summations are sent into the I and Q input ports of a DAC, respectively. $f_{s1}$ and $f_{s2}$ can be equal or unequal. The operations before DAC can all be performed by software-based DSP (208). Alternatively, these operations may be implemented partly in software and partly using electrical circuits for computationally intensive operations such as filtering.

Next, the electrical I and Q outputs of the DAC 210 are used to drive the I and Q ports of an I/Q modulator 212, respectively. A free-running laser source offers a CW lightwave at frequency $f_c$ for the optical input port of the I/Q modulator. As we know, a SSB electrical signal can be linearly converted to a SSB optical signal when its real and imaginary parts are used to drive an I/Q modulator 212. In this embodiment, it is the real and imaginary parts of the linear combination of one SSB electrical signal and one SSB electrical carrier that are used to drive the I/Q modulator, which leads to simultaneous linear conversion of the SSB electrical signal and the SSB electrical carrier to optical domain. Thus, by properly adjusting the DC-biases of the I/Q modulator, the optical output of the I/Q modulator can be a LSB optical vector signal at frequency $f_c-f_{s1}$ and a USB optical carrier at frequency $f_c+f_{s2}$ with a significantly suppressed central optical carrier at frequency $f_c$, which we define as asymmetrical SSB modulation when $f_{s1}$ and $f_{s2}$ are unequal (spectrum graph 216).

The generated asymmetrical SSB signal is then up-converted by a single-ended PD 218 to an electrical vector mm-wave signal at frequency $(f_{s1}+f_{s2})$, for example, as shown in the graph 214. In the scheme 200, some embodiments can also use USB to carry vector signal when LSB is kept unmodulated. The generated asymmetrical SSB signal is robust to fiber dispersion effects and can be transmitted over relatively long-haul fiber since only one sideband carries signal.

Example Experimental Setup and Results

Figure 3A:
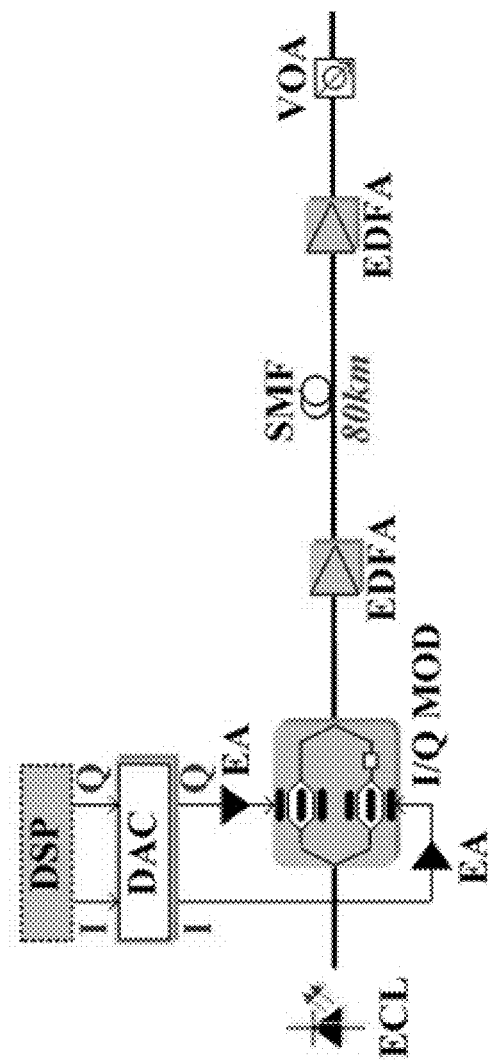
FIG. 3A and FIG. 3B show an example embodiment for generating optical signals for transmission over a fiber and wireless transmission mediums.
Figure 3B:
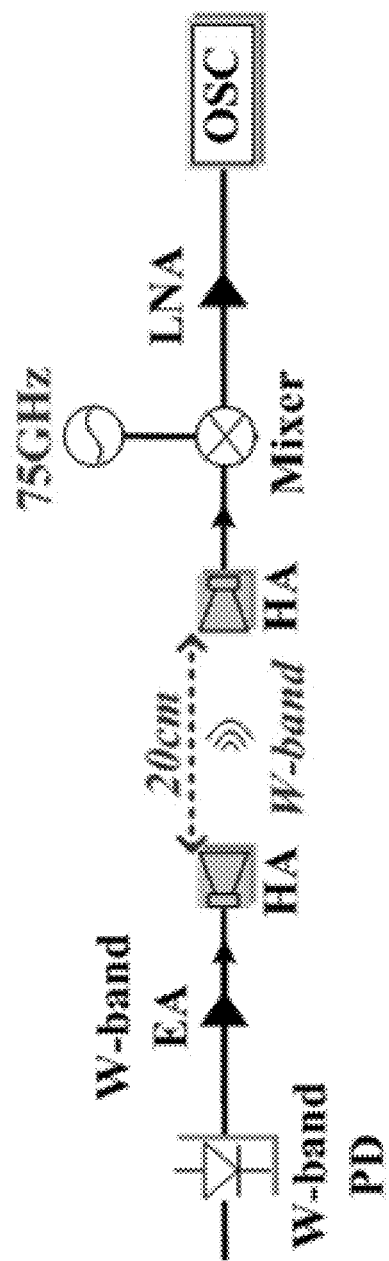
Figure 4A:
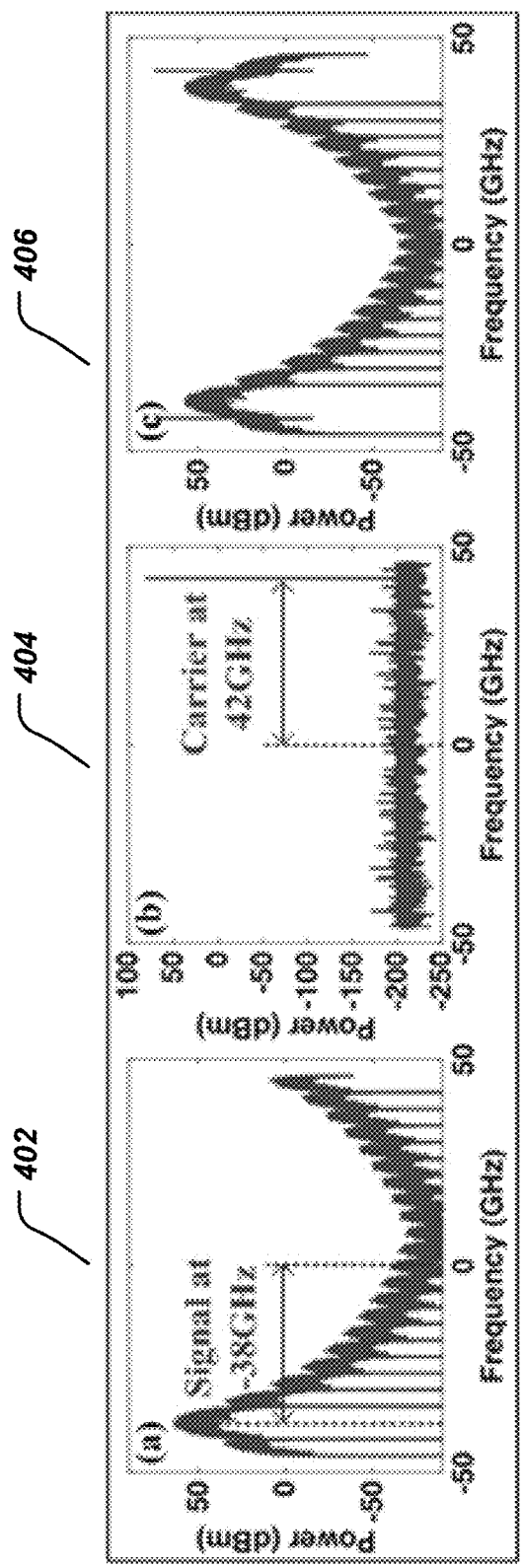
FIG. 4A and FIG. 4B show performance graphs for a tested embodiment.
Figure 4B:
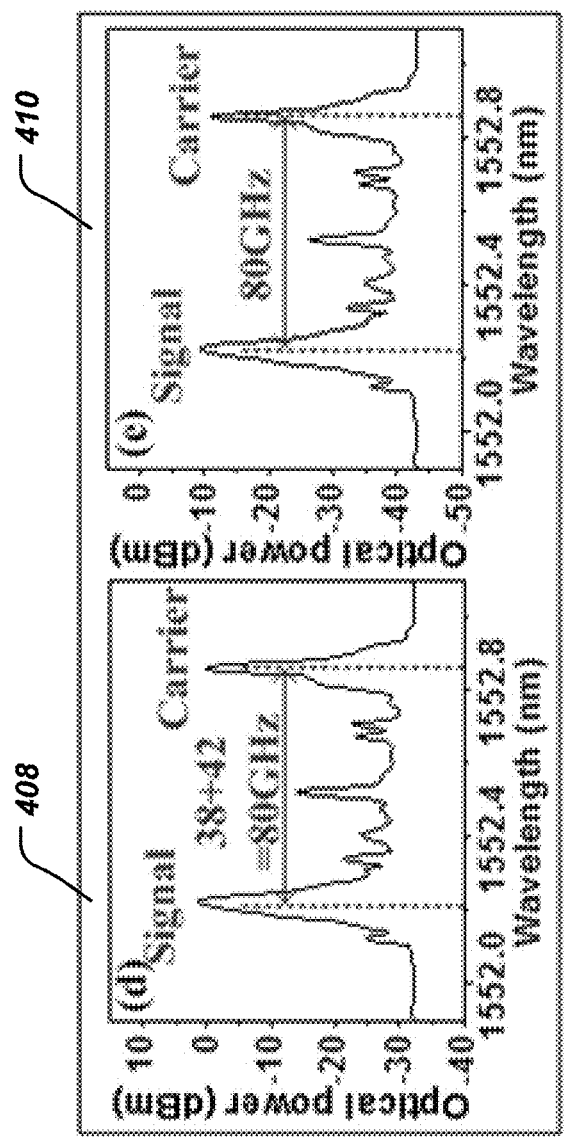

FIG. 3A and FIG. 3B give the experimental setup for generation and fiber-wireless-integration transmission of 4-Gbaud 80-GHz QPSK-modulated SSB vector mm-wave signal based on our proposed scheme. At the transmitter side, the DSP operation before the 92-GSa/s DAC with 16-GHz 3-dB electrical bandwidth is implemented by MATLAB programming. Here, the PRBS length is $2^9$. A 4-Gbaud baseband vector signal adopting QPSK modulation is linearly converted to a LSB vector signal located at −38-GHz carrier frequency, the calculated spectrum of which is given by FIG. 4A, graph 402. FIG. 4A, graph 404 gives the calculated spectrum of the USB digital carrier at 42 GHz. Graph 406 gives the calculated spectrum of the I input of the 92-GSa/s DAC. The amplified I and Q outputs of the 92-GSa/s DAC are used to drive an I/Q modulator with 32-GHz optical bandwidth, which modulates a CW lightwave at 1552.524 nm generated from an ECL with <100-kHz linewidth and 13-dBm output power. The output optical power of the I/Q modulator is −24 dBm. Graph 408 gives the measured output optical spectrum (0.02-nm resolution) of the I/Q modulator, showing a QPSK-modulated LSB and an un-modulated USB spaced by (38 GHz+42 GHz)=80 GHz. After boosted by an EDFA, the generated 80-GHz SSB signal is transmitted over 80-km SMF-28 without optical dispersion compensation. Graph 410 shows the measured optical spectrum (0.02-nm resolution) after 80-km SMF-28 transmission.

After boosted by the second EDFA (which may be optionally present), the received 80-GHz SSB signal is up-converted to an 80-GHz QPSK-modulated electrical mm-wave signal by a W-band single-ended PD with 90-GHz optical bandwidth. The variable optical attenuator (VOA) before the PD is used to adjust the input power into PD for BER measurement. After amplified by a W-band EA with 30-dB gain and 3-dBm saturation output power, the generated 80-GHz electrical mm-wave signal is radiated by a W-band horn antenna (HA) into air space, and then received by another identical HA. The two HAs with a high directionality are separated by 20 cm and each has a 25-dBi gain. At the wireless receiver side, the received 80-GHz mm-wave signal is down-converted by a 75-GHz sinusoidal RF source and a commercial balanced mixer into a 5-GHz IF signal, which passes through a low-noise amplifier (LNA) and is then captured by a 160-GSa/s digital OSC with 65-GHz electrical bandwidth. The transmitter data can be recovered from the 5-GHz IF signal after offline DSP, including down conversion, CMA equalization, carrier recovery, and BER calculation.

Figure 5:
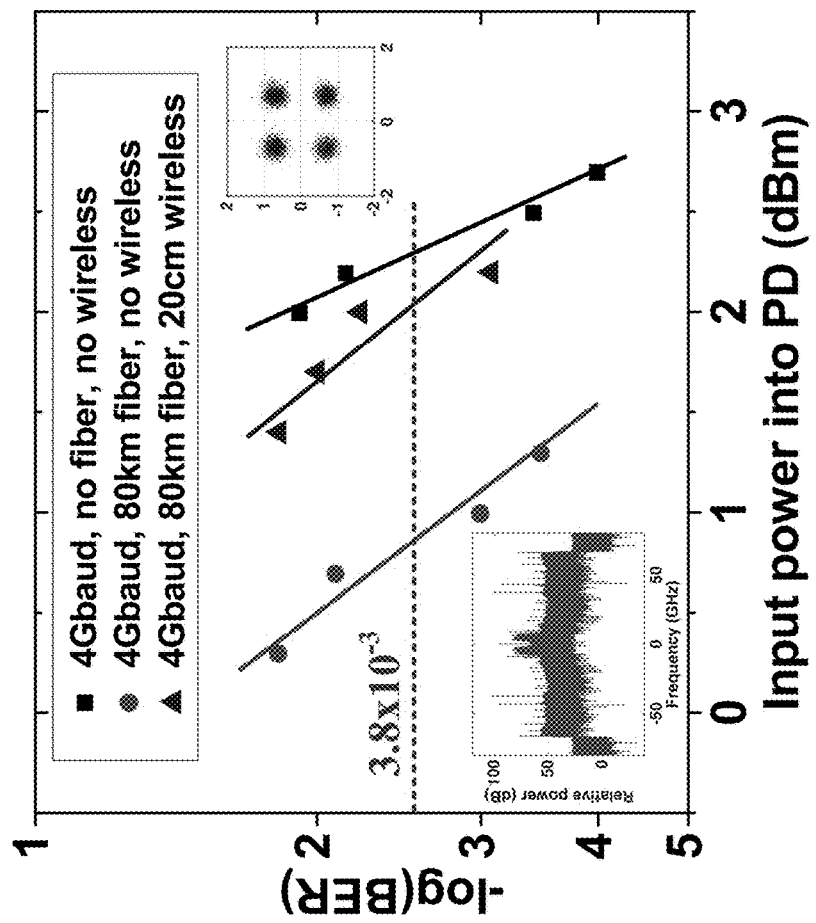
FIG. 5 shows an example graph of performance of a fiber-wireless integration transmission system of a tested embodiment.

FIG. 5 gives the measured BER versus the input power into PD for 4-Gbaud 80-GHz mm-wave signal in three different scenarios: (1) without both fiber and wireless transmission, (2) with 80-km SMF-28 transmission only, and (3) with both 80-km SMF-28 and 20-cm wireless transmission. The BER can reach $3.8 \times 10^{-3}$ for all three scenarios. Compared to the first scenario, the second one introduces 1.4-dB receiver sensitivity improvement at the BER of $3.8 \times 10^{-3}$ after 80-km SMF-28 transmission, which is because self-phase modulation and fiber dispersion effects caused by fiber transmission make the received eye diagram more open. In addition, 20-cm wireless transmission causes 1.2-dB power penalty at the BER of $3.8 \times 10^{-3}$. Note that wireless transmission distance can be largely extended if a W-band EA, identical to that adopted at the wireless transmitter, is adopted at the wireless receiver. Insets in FIG. 5 give the captured 5-GHz IF signal spectrum and the recovered QPSK constellation for the 4-Gbaud 80-GHz mm-wave signal after 80-km SMF-28 and 20-cm wireless transmission. The input power into PD is 5.3 dBm and no bit error is recorded within the collected data.

Figure 6:
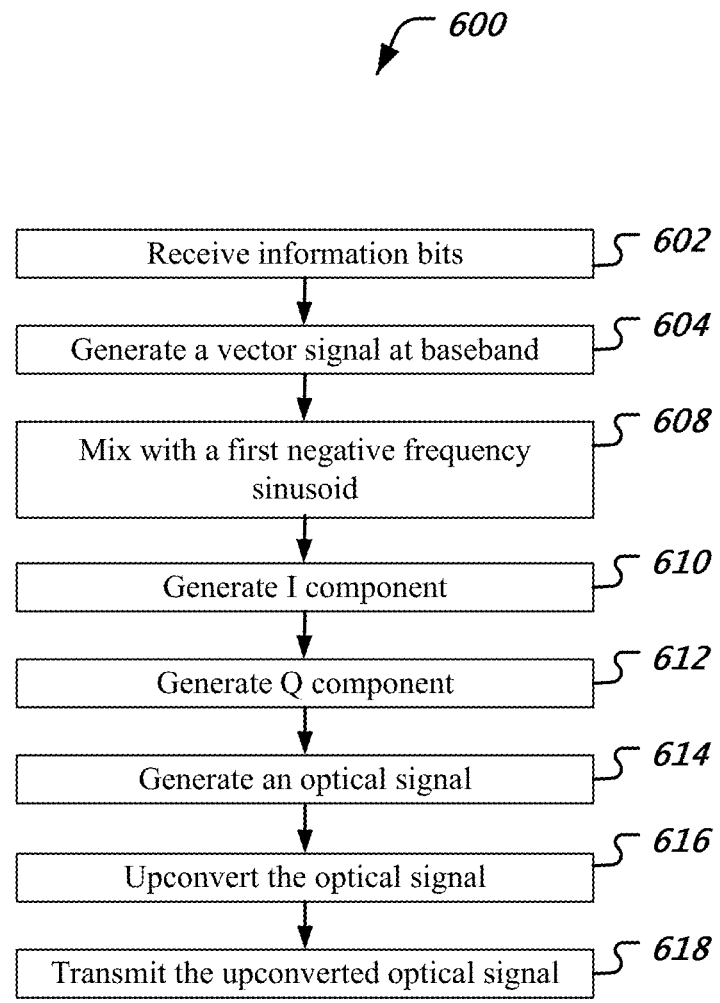
FIG. 6 shows an example flowchart for a method of optical signal transmission.

FIG. 6 is a flowchart of an example method 600, implemented by the transmission circuitry of an optical equipment, e.g., apparatus 102, 106.

The method 600 includes, at 602, receiving information bits. The information bits may be locally generated, e.g., by applications running on the local device (e.g., a server) or may be received at a data interface from an external device. The external device may be, for example, a multiplexer, switch or one or more user devices that generates user data for transmission.

The method 600 includes, at 604, modulating the information bits to generate a complex vector signal at baseband. Various vector modulation techniques could be used such as QPSK (4, 8, 16) or QAM (4, 8, 16, 32, 64, and so on). In some embodiments, the resulting signal may be lowpass filtered through a lowpass filter to attenuate unwanted energy leakage outside a target bandwidth of the signal.

During the generation of the complex vector signal, due to mixing baseband vector signal with a complex sinusoidal RF source (see, e.g., FIG. 2). The complex sinusoidal RF source can be considered as a real sinusoidal RF source with its positive or negative spectrum removed by Hilbert-transform phasing or similar method. The real sinusoidal RF source has both positive and negative spectra, while the complex sinusoidal RF source only has positive or negative spectrum.

The method 600 includes, at 608, mixing the complex baseband signal with a complex sinusoidal source at a negative first frequency to produce a lower sideband (LSB) vector signal at the negative first frequency, for example, as described with respect to FIG. 2.

The method 600 includes, at 610, generating an I-component by adding a real part of the LSB vector signal with a real part of a complex sinusoidal signal at a positive second frequency, for example, as described with respect to FIG. 2.

The method 600 includes, at 612, generating a Q-component by adding an imaginary part of the LSB vector signal with an imaginary part of the complex sinusoidal signal at the positive second frequency, for example, as described with respect to FIG. 2. In some embodiments, the operations 604, 608, 610 and 612 may be performed numerically using a digital signal processor.

The method 600 includes, at 614, producing, using an I/Q modulator, from the I-component, the Q-component and an optical source at a carrier frequency, an optical SSB signal. The optical SSB signal may have a spectrum that looks similar to the illustration in FIG. 2 (216).

The method 600 includes, at 616, upcoverting the optical SSB signal to a desired RF carrier, for example, an electrical vector mm-wave signal (for example, as depicted in FIG. 2, 214). In some embodiments, the desired RF carrier signal may be equal to the numerical sum of the first frequency and the second frequency, but other values may also be used depending on application, antenna design and so on.

The method 600 includes, at 618, transmitting the optical SSB signal over a transmission medium.

Figure 7:
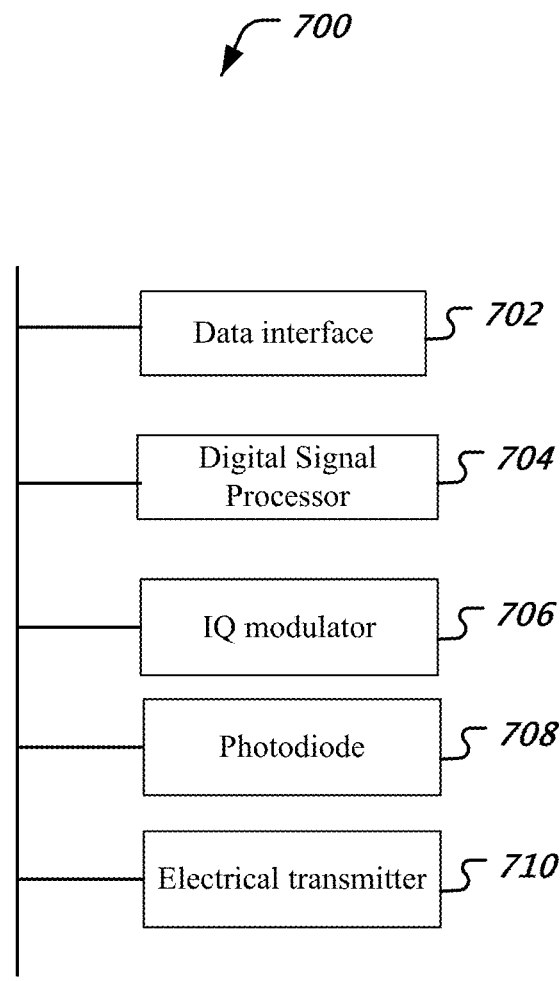
FIG. 7 shows a block diagram for an example optical transmission apparatus.

FIG. 7 illustrates an example optical transmission equipment 700 that includes a data interface 702, a digital signal processor 704 (which, in some embodiments, may be functionally similar to 208), an I/Q modulator 706, a photodiode 708 and an electrical signal transmitter 710. The data interface 702 receives information bits, e.g., through a software API or from an external network connection. The digital signal processor reads code from a memory and implements operations 604, 608, 610 and 612. The I/Q modulator 706, which may be functionally similar to 212, generates an optical SSB signal. The photodiode 708 may be functionally similar to the photodiode 218. The electrical signal transmission stage 710 may transmit the resulting electrical vector mm-wave signal over a transmission medium such as air or another medium.

It will be appreciated that a simple photonic vector mm-wave signal generation scheme adopting asymmetrical single-sideband modulation (SSBM) through the use of one single I/Q modulator is disclosed. The output of the I/Q modulator is one vector-modulated USB (LSB) and one un-modulated LSB (USB), and the two sidebands have unequal frequency spacing from the significantly suppressed central optical carrier. We experimentally demonstrate the generation and fiber-wireless-integration transmission of 4-Gbaud 80-GHz QPSK-modulated vector mm-wave signal adopting the combination of 38-GHz LSB signal and 42-GHz USB carrier. Because of SSBM, the generated 4-Gbaud SSB optical signal at 80 GHz is transmitted over 80-km SMF-28 without the need for optical dispersion compensation either at transmitter or at a receiver. It will further be appreciated that no precoding needs to be performed and thus the disclosed technique lends itself to the use of denser constellations (e.g., 16 QAM or above).

The disclosed and other embodiments and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of optical communication, implemented at a transmitter in an optical communication network, comprising:
   receiving information bits;
   modulating the information bits to generate a complex vector signal at baseband;
   mixing the complex baseband signal with a complex sinusoidal signal at a negative first frequency to produce a lower sideband (LSB) vector signal at the negative first frequency;
   generating an I-component by adding a real part of the LSB vector signal with a real part of the complex sinusoidal signal at a positive second frequency;
   generating a Q-component by adding an imaginary part of the LSB vector signal with an imaginary part of the complex sinusoidal signal at the positive second frequency;
   producing, using an I/Q modulator, from the I-component, the Q-component and an optical source at a carrier frequency, an optical SSB signal;
   upconverting the optical SSB signal to a desired radio-frequency (RF) carrier frequency; and
   transmitting the signal at the desired RF carrier frequency over a transmission medium.

2. The method of claim 1, wherein the first frequency and the second frequency are unequal, and thereby the optical SSB signal is an asymmetrical signal.

3. The method of claim 1, wherein the upconverting includes upconverting the optical SSB signal to an electrical frequency that is numerically equal to a sum of the first frequency and the second frequency.

4. The method of claim 1, wherein the vector signal at baseband is generated by lowpass filtering the modulation information bits.

5. The method of claim 1, wherein the vector signal uses one of a quadrature phase shift keying (QPSK) or a quadrature amplitude modulation (QAM) constellation.

6. The method of claim 5, wherein the QPSK modulation scheme is an 4-QPSK modulation scheme.

7. The method of claim 1, wherein the upconverting the optical SSB signal includes operating a photodiode to produce an electrical vector mm-wave signal.

8. The method of claim 1, wherein the vector signal at baseband comprises a 4 Gbaud QPSK signal, wherein the first frequency comprises 38 GHz and the second frequency comprises 42 GHz, and wherein the carrier frequency comprises 80 GHz.

9. The method of claim 8, wherein the transmission medium comprises a single mode fiber optical transmission medium having 80 kilometer length, and wherein the optical SSB signal is recoverable after the transmission over the transmission medium at a bit error rate of $3.8 \times 10^{-3}$ without performing optical dispersion compensation.

10. The method of claim 1, wherein the first frequency and the second frequency are equal, and thereby the optical SSB signal is a symmetrical signal.

11. An optical transmitter apparatus, comprising:
a data interface that receives information bits;
a digital signal processor to read instructions stored on a memory to implement a method, the instructions comprising:
code for modulating the information bits to generate a complex vector signal at baseband;
code for mixing the complex baseband signal with a complex sinusoidal source at a negative first frequency to produce a lower sideband (LSB) vector signal at the negative first frequency;
code for generating an I-component by adding a real part of the LSB vector signal with a real part of a complex sinusoidal signal at a positive second frequency; and
code for generating a Q-component by adding an imaginary part of the LSB vector signal with an imaginary part of the complex sinusoidal signal at the positive second frequency;
an I/Q modulator configured to obtain an optical SSB signal from the I-component, the Q-component and an optical source at a carrier frequency;
a photodiode configured to upcovert the optical SSB signal to a desired radio-frequency (RF) carrier frequency; and
a signal transmission stage that transmits the signal at the desired RF carrier frequency over a transmission medium.

12. The apparatus of claim 11, wherein the first frequency and the second frequency are unequal, and thereby the optical SSB signal is an asymmetrical signal.

13. The apparatus of claim 11, wherein the photodiode is configured to upconvert the optical SSB signal to an electrical frequency that is numerically equal to a sum of the first frequency and the second frequency.

14. The apparatus of claim 11, wherein the vector signal at baseband is generated by lowpass filter configured to filter the modulation information bits.

15. The apparatus of claim 11, wherein the vector signal has a modulation format of one of a quadrature phase shift keying (QPSK) or a quadrature amplitude modulation (QAM) constellation.

16. The apparatus of claim 15, wherein the QPSK modulation scheme is an 4-QPSK modulation scheme.

17. The apparatus of claim 11, wherein the vector signal at baseband comprises a 4 Gbaud QPSK signal, wherein the first frequency comprises 38 GHz and the second frequency comprises 42 GHz, and wherein the carrier frequency comprises 80 GHz.

18. The apparatus of claim 17, wherein the transmission medium comprises a single mode fiber optical transmission medium having 80 kilometer length, and wherein the optical SSB signal is recoverable after the transmission over the transmission medium at a bit error rate of $3.8 \times 10^{-3}$ without performing optical dispersion compensation.

19. The apparatus of claim 11, wherein the first frequency and the second frequency are equal, and thereby the optical SSB signal is a symmetrical signal.

* * * * *